United States Patent
Namm

(10) Patent No.: US 9,326,486 B2
(45) Date of Patent: May 3, 2016

(54) METHOD AND APPARATUS FOR BLOCKING UNWANTED CANINE INTERACTIONS

(71) Applicant: MOTOROLA SOLUTIONS, INC, Schaumburg, IL (US)

(72) Inventor: Joseph C Namm, Plantation, FL (US)

(73) Assignee: MOTOROLA SOLUTIONS, INC., Schaumburg, IL (US)

(*) Notice: Subject to any disclaimer, the term of this patent is extended or adjusted under 35 U.S.C. 154(b) by 95 days.

(21) Appl. No.: 14/264,185

(22) Filed: Apr. 29, 2014

(65) Prior Publication Data

US 2015/0305303 A1  Oct. 29, 2015

(51) Int. Cl.
*A01K 15/04* (2006.01)
*A01K 15/02* (2006.01)
*H04B 7/24* (2006.01)

(52) U.S. Cl.
CPC ............ *A01K 15/021* (2013.01); *A01K 15/023* (2013.01); *H04B 7/24* (2013.01)

(58) Field of Classification Search
CPC . A01K 15/023; A01K 27/009; A01K 15/021; H04B 7/24; H04B 7/26
USPC .......................................... 119/719–721, 712
See application file for complete search history.

(56) References Cited

U.S. PATENT DOCUMENTS

| | | | |
|---|---|---|---|
| 4,689,776 A | 8/1987 | Thorndyke et al. | |
| 5,241,923 A * | 9/1993 | Janning | A01K 11/006 119/721 |
| 5,606,305 A | 2/1997 | Jan | |
| 5,636,597 A * | 6/1997 | Van Curen | A01K 15/023 119/720 |
| 5,952,925 A * | 9/1999 | Secker | A01K 15/02 119/859 |
| 6,151,276 A | 11/2000 | Peinetti | |
| 6,158,392 A * | 12/2000 | Andre | A01K 15/023 119/721 |
| 6,850,151 B1 | 2/2005 | Calhoun et al. | |
| 7,180,424 B2 | 2/2007 | Eyal | |
| 7,711,319 B2 * | 5/2010 | Namm | H04W 4/08 455/11.1 |
| RE41,629 E | 9/2010 | Bonge | |
| 7,830,257 B2 * | 11/2010 | Hassell | A01K 11/006 340/539.1 |
| 8,011,327 B2 | 9/2011 | Mainini et al. | |
| 8,186,310 B1 * | 5/2012 | Smith | A01K 15/02 119/719 |
| 8,374,544 B2 * | 2/2013 | Iwasaki | H04B 5/0031 455/158.5 |
| 8,779,925 B2 * | 7/2014 | Rich | A01K 15/023 119/712 |
| 8,839,744 B1 * | 9/2014 | Bianchi | A01K 15/021 119/720 |
| 9,100,988 B2 * | 8/2015 | Vilmur | H04W 16/26 |
| 2008/0003942 A1 * | 1/2008 | Namm | H04W 4/10 455/11.1 |
| 2008/0159079 A1 * | 7/2008 | Dir | A01K 97/125 367/139 |
| 2008/0173255 A1 | 7/2008 | Mainini et al. | |
| 2008/0180256 A1 | 7/2008 | Caldwell | |
| 2009/0205582 A1 | 8/2009 | Kitchens | |
| 2012/0132151 A1 | 5/2012 | Touchton et al. | |
| 2012/0272923 A1 | 11/2012 | Stephens et al. | |
| 2012/0312250 A1 | 12/2012 | Jesurum | |
| 2013/0092099 A1 | 4/2013 | Hardi et al. | |
| 2013/0249694 A1 | 9/2013 | Hardi et al. | |
| 2014/0251233 A1 * | 9/2014 | Bianchi | A01K 15/021 119/720 |

FOREIGN PATENT DOCUMENTS

| | | |
|---|---|---|
| EP | 1157611 B1 | 11/2004 |
| WO | 2013082227 A1 | 6/2013 |
| WO | 2014011195 A1 | 1/2014 |

* cited by examiner

*Primary Examiner* — Kristen C Hayes

(57) ABSTRACT

A method and apparatus for blocking unwanted canine interactions during a canine deployment at a public-safety incident scene is provided herein. During operation all radios associated with a public-safety incident scene will be provided a notification of canine deployment. The radios will then generate a tone to deter or repel any approaching canine.

10 Claims, 6 Drawing Sheets

METHOD AND APPARATUS FOR BLOCKING UNWANTED CANINE INTERACTIONS

FIELD OF THE INVENTION

The present invention generally relates to blocking unwanted canine interactions, and more particularly to a method and apparatus for blocking unwanted canine interactions during a canine deployment at a public-safety incident scene.

BACKGROUND OF THE INVENTION

Most (if not all) police agencies with canine units have had a canine mistakenly attack other public safety officers at an incident scene. Therefore a need exists for a method and apparatus for blocking unwanted canine interactions during a canine deployment at a public-safety incident scene.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for blocking unwanted canine interactions during a canine deployment at an incident scene is provided herein. During operation all radios associated with a public-safety incident scene will be provided a notification of canine deployment. The radios will then generate a tone to deter or repel any approaching canine.

In a first embodiment, a public-safety dispatch center is notified of canine deployment at an incident scene. The dispatch center then determines all radios associated with a particular incident (similar CAD incident identifier). The dispatch center will then instruct all radios associated with the incident to generate a tone to deter or repel any approaching canine.

In a second embodiment of the present invention, canine deployment at an incident scene will automatically generate a local alert to all radios within a predetermined distance from the deployment. All radios that receive the local alert will generate a tone to deter or repel any approaching canine. For example, a collar or a car door might be configured to send out a local alert when a canine is released. All radios that "hear" the peer-to-peer alert will generate the tone.

Figure 1:
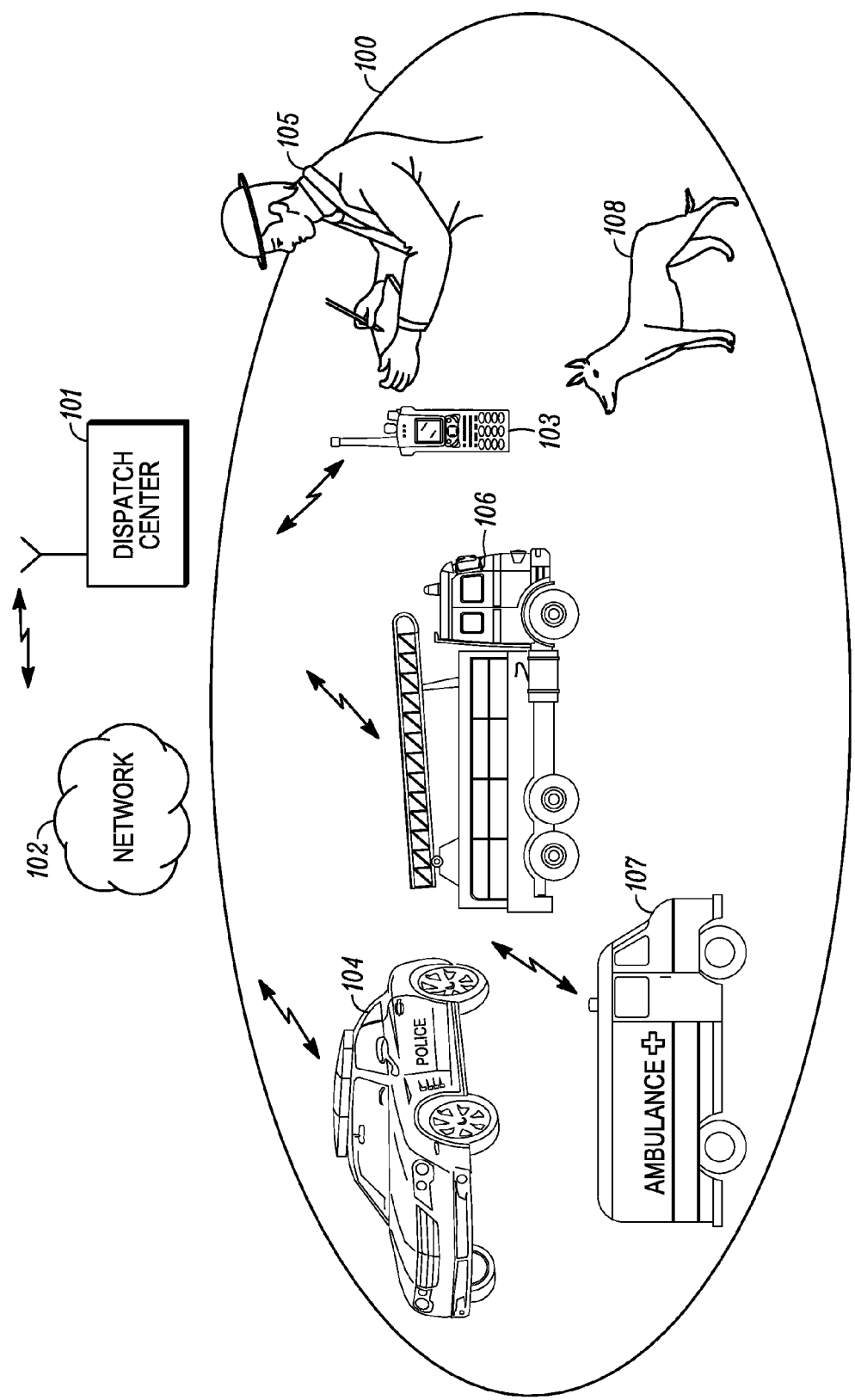
FIG. 1 illustrates a typical operational environment where canine deployment may take place.

Turning now to the drawings, wherein like numerals designate like components, FIG. 1 is a block diagram showing a general operational environment, according to one embodiment of the present invention. As shown in FIG. 1 a plurality of public-safety vehicles 104, 106, and 107 are in communication with dispatch center 101 through intervening network 102. Public-safety vehicles 104, 106, and 107, along with radios 103, officer 105 and canine 108 are all located within a geographic area 100, which preferably comprises a public-safety incident scene.

Public-safety vehicles 104, 106, and 107 may comprise such vehicles as rescue vehicles, ladder trucks, ambulances, police vehicles, fire engines, automobiles, motorcycles, . . . , etc. Network 102 may comprise one of any number of over-the-air or wired networks. For example network 102 may comprise a next-generation cellular communications network operated by a cellular service provider, or any public-safety network such as an APCO 25 network or the FirstNet broadband network.

Multiple public-safety officers 105 (only one shown) are typically at an incident scene. Each of these officers is typically associated with a radio 103 (again, only one radio shown in FIG. 1). Radio 103 is designed to communicate with dispatch center 101 through intervening network 102.

Dispatch center 101 preferably comprises a computer-aided dispatch system which communicates with radios 103 and with mobile data terminals (not shown in FIG. 1) installed in vehicles. Dispatch center 101 operates to:

Log On/Off times of Police Personnel;

Generate incident IDs and archive incidents that begin with a phone call from a citizen or originate from personnel in the field;

Assigning field personnel to incidents by associating the field personnel with an incident ID;

Updating Incidents and logging those updates;

Generating Case Numbers for incidents that require an investigation; and

Timestamping every action taken by the dispatcher at the terminal.

In an ideal setting, a call is received by a dispatch operator and information about the call is inputted into the CAD template through a user interface. Location, Reporting Party, and Incident are the main fields that have to be populated by type-codes. For example, if there was a burglary in progress, the type-code for that incident could be "BURG"; when BURG is typed out, then the program will spell out "BURGLARY (in progress)". If the location was at the 1400 block of Madison, the type-code could be "14MAD." The reporting party information would be populated by the call-taker including last name, first name, call-back number, etc. An incident identification (sometimes referred to as an incident scene identifier, or a CAD incident identifier) is then generated for the incident. This ID could be something as simple as a number, or something as complicated as an identification that is a function of populated fields.

As discussed above, most (if not all) police agencies with canine units have had a canine mistakenly attack other public safety officers that happen to be in the wrong place/wrong time. More specifically, at many incident scenes, canine 108 may be deployed to apprehend an individual. Canine 108 may mistake an officer at the incident scene for the individual that needs to be apprehended. In order to address this issue, all radios 103 associated with a public-safety incident scene will be provided a notification of canine deployment. The radios will then generate a tone to deter or repel any approaching canine. Although any tone may be used, in one embodiment of the present invention a 20-55 kHz tone at varying modulation levels will be utilized since that tone is uncomfortable for canines and also effective at repelling them. In another embodiment of the present invention any tone or sound may be utilized and the canine trained to avoid attaching anyone associated with the tone or sound.

Because each officer at an incident scene is usually associated with at least one radio 103, each officer will be protected from accidental apprehension by canine 108, since their associated radio will aide in deterring or repelling any approaching canine.

Figure 2:
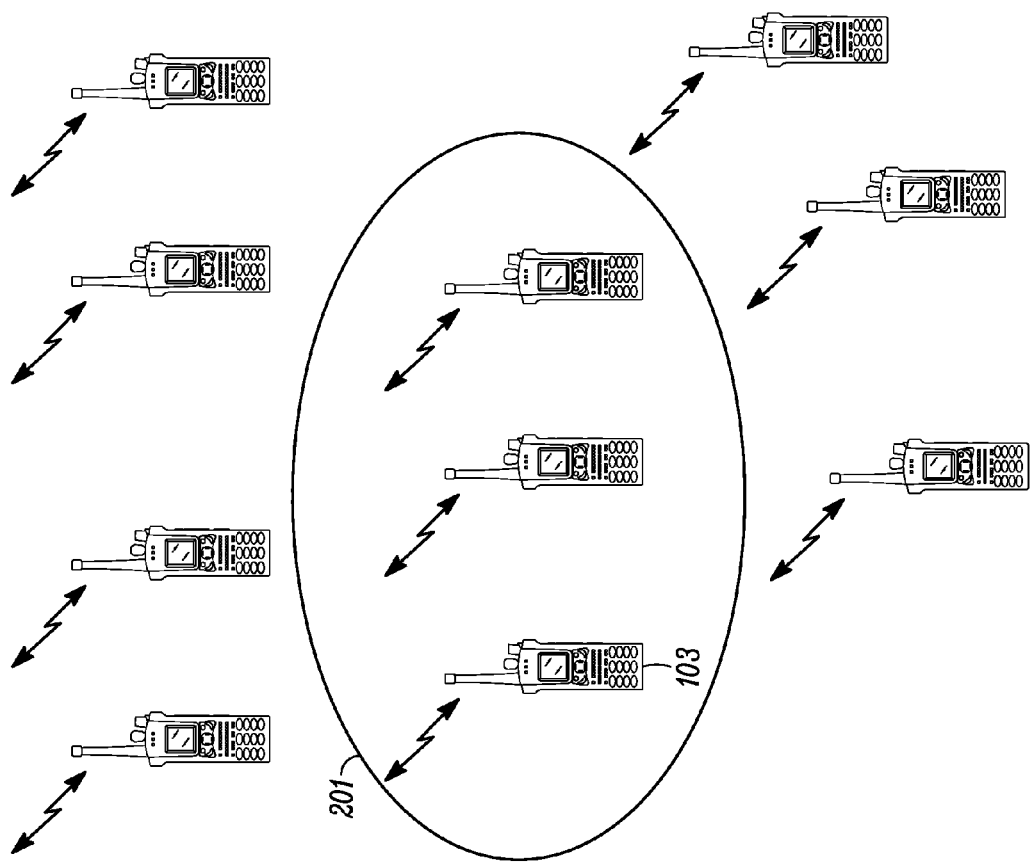
FIG. 2 illustrates radios groped by a Computer-Aided Dispatch (CAD) incident scene identifier.

FIG. 2 illustrates radios grouped by a Computer-Aided Dispatch (CAD) incident scene identifier. As one of ordinary skill in the art will recognize, multiple radios 103 may be utilized as part of any public-safety system. However, only certain radios within group 201 may be assigned to (or located near) any particular incident. In both the first and the second embodiments of the present invention, only radios within group 201 will be notified by device 202 of a canine deployment, and generate a repelling tone in response. All other radios 103 will not generate the repelling tone.

In the first embodiment, device 202 comprises dispatch center 101. More particularly, dispatch center 101 will receive a notification of canine deployment at an incident scene, determining a CAD incident identifier assigned to the canine handler, determine all radios having a similar CAD incident identifier, and Instruct radios within group 201 with the similar CAD incident identifier to generate a tone.

In the second embodiment, device 202 comprises a local transmitter (local to the incident scene) that detects the release of a canine. The detected release will automatically generate a local alert to all radios that is only heard if the radios are within a predetermined distance from the deployment (e.g., ½ mile). All radios that receive the local alert will generate a tone to deter or repel any approaching canine. For example, a collar or a car door might be configured to send out a local alert when a canine is released. All radios within group 201 will "hear" the alert will generate the tone. Thus, device 202 will determine when a canine has been released and generate a local alert that instructs radios to generate a tone.

Figure 3:
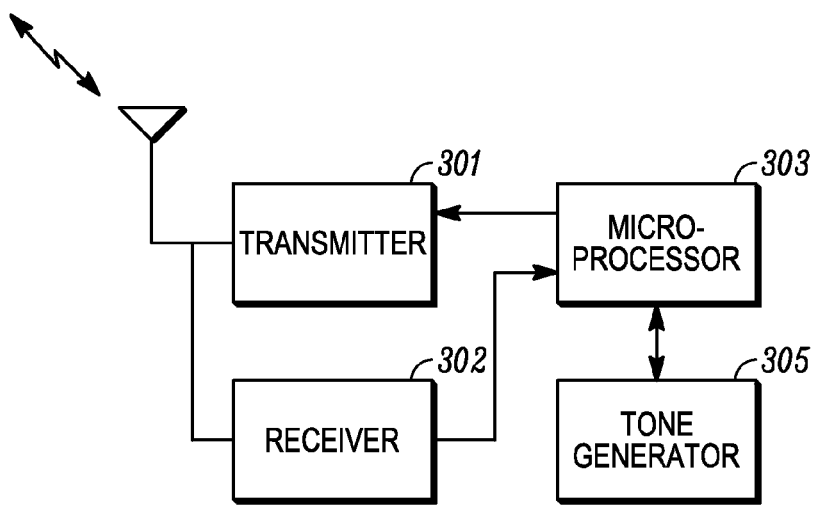
FIG. 3 is a block diagram of a radio shown in FIG. 2.

FIG. 3 is a block diagram of a radio 103 shown in FIG. 1 and FIG. 2. As shown, radio 103 comprises logic circuitry 303, transmit circuitry 301, receive circuitry 302, and speaker 305 (serving as a tone generator). Logic circuitry 303 preferably comprises a microprocessor controller, such as, but not limited to an ARM9 microprocessor. In the preferred embodiment of the present invention logic circuitry 303 serves to analyze received message content, and generate a tone from speaker 305 when the message content indicates a release of a canine. Transmit and receive circuitry 301 and 302 are common circuitry known in the art for communication utilizing a well known network protocols, and serve as means for transmitting and receiving messages.

Figure 4:
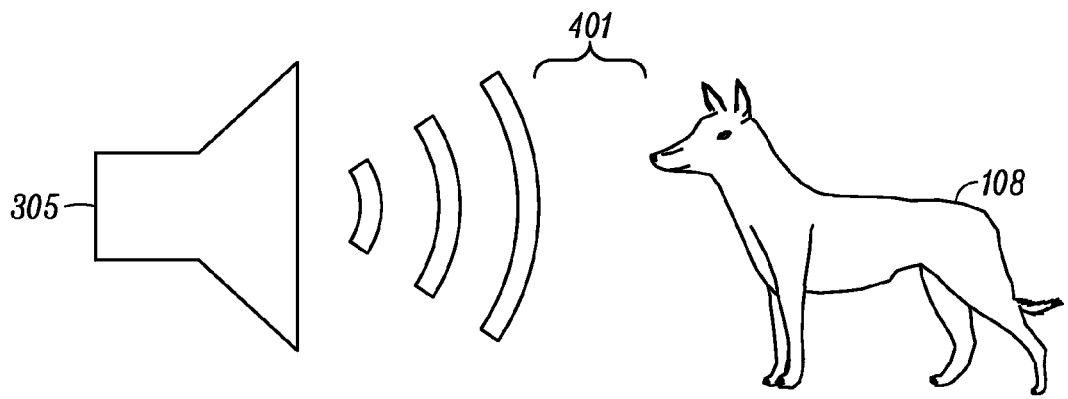
FIG. 4 illustrates a canine interaction in accordance with an embodiment of the present invention.

FIG. 4 illustrates a canine interaction in accordance with an embodiment of the present invention. As shown, tone generator 305 emits a tone or signal that is designed to keep canine 108 a distance from generator 305.

Figure 5:
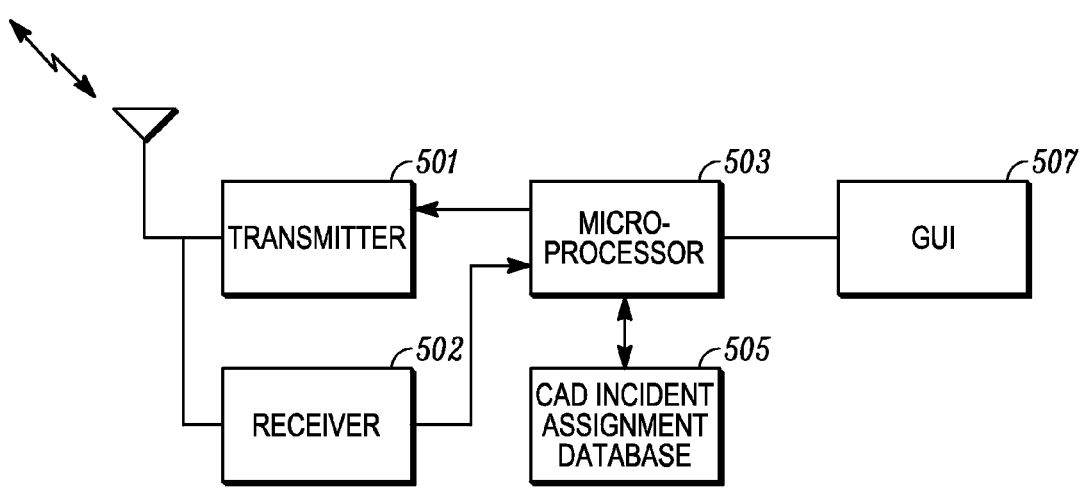
FIG. 5 is a block diagram of a CAD dispatch center shown in FIG. 2.

FIG. 5 is a block diagram of CAD center 101 shown in FIG. 2. As shown, dispatch center 101 comprises logic circuitry 503, transmit circuitry 501, receive circuitry 502, and storage 505 serving as CAD incident assignment database 505. Logic circuitry 503 preferably comprises a digital signal processor (DSP), general purpose microprocessor, a programmable logic device, or application specific integrated circuit (ASIC). In the preferred embodiment of the present invention logic circuitry 503 determines when a canine has been released and instructs transmitter 501 to notify appropriate radios 103 of a canine release (via a non-voice data channel or via a control channel). A land-mobile radio's 103 data channel (EVDO or broadband in future), voice channel, or control channel connection to the dispatch center will be utilized to receive information on canine release. The radios can send this release status as data packet integrated with inbound voice or a unique inbound status message on a data or control channel.

Transmit and receive circuitry 501 and 502 are common circuitry known in the art for communication utilizing a well known network protocols, and serve as means for transmitting and receiving messages. Graphical user interface (GUI) 507 receives an input from a user and to provide the appropriate input to logic circuitry 503. In order to provide the above features (and additional features), GUI 507 may include a monitor, a keyboard, a mouse, and/or various other hardware components to provide a man/machine interface.

Finally, storage 505 comprises standard random access memory and is utilized for storing a radio's identification along with a current Computer-Aided Dispatch identification (CAD ID). All radios 103 assigned to a particular incident will be assigned the incident ID and have this information stored in database 505.

In the first embodiment of the present invention, dispatch center 101 will need to be notified of a canine release, since it is the dispatch center 101 that instructs radios 103 to emit a repulsion tone. This may be accomplished simply by the canine handler sending a voice communication to the dispatch operator. For example, the canine operator may communicate "dog released" to the dispatch operator. When this information is provided to logic circuitry 503, those steps shown in FIG. 9 will be taken.

Figure 6:
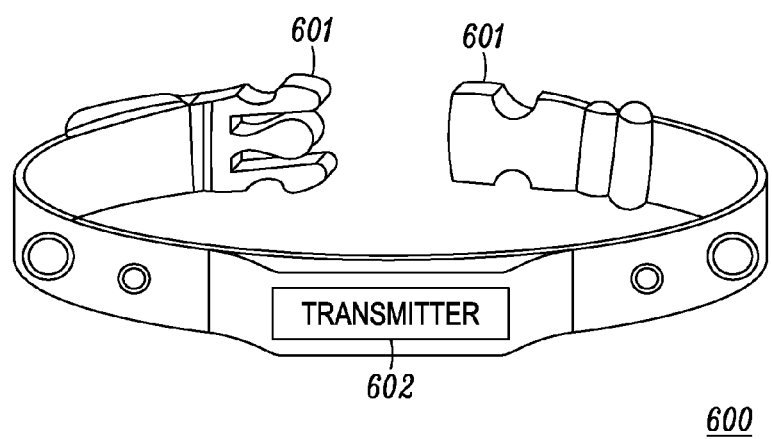
FIG. 6 illustrates a dog collar in accordance with an embodiment of the present invention.

In another embodiment of the present invention a door sensor, or collar sensor may be utilized to notify dispatch center 101 of a canine release. This is illustrated in FIG. 6. As shown, collar 600 comprises transmitter 602 and latch 601. Latch 601 serves as a switch, coupled to transmitter 602. Opening of latch 601 causes transmitter 602 to emit a data signal to dispatch center 101 that indicates a canine has been released.

It should be noted that collar 600 may be utilized when providing a local notification that a canine has been released. More particularly, in the second embodiment of the present invention, transmitter 602 will provide a short-range communication (e.g., ½ mile) to all radios 103 within the area, causing them to emit the repulsion tone.

Figure 7:
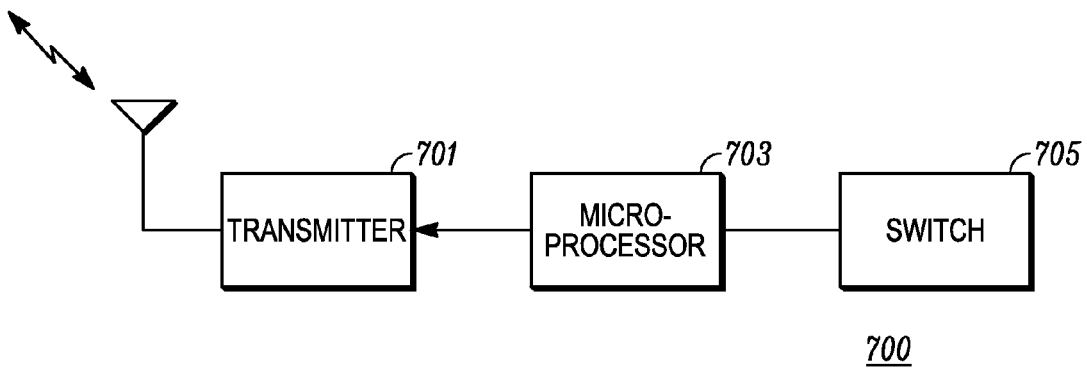
FIG. 7 is a block diagram of a radio as part of the collar of FIG. 6.

FIG. 7 is a more-detailed block diagram of radio 700 as part of the collar of FIG. 6. Although the circuitry shown in FIG. 7 is preferably provided within a collar as shown in FIG. 6, in alternate embodiments of the present invention the circuitry shown in FIG. 7 may be incorporated into other devices that could indicate release of a canine. For example, the door of a car used to release a canine may comprise switch 705 integrated into door latch. Transmitter 701 is triggered when a clasp/latch opens and the switch is opened.

As shown, collar 600 comprises switch 705, logic circuitry 703, and transmitter 701. Logic circuitry 703 preferably comprises a digital signal processor (DSP), general purpose microprocessor, a programmable logic device, or application specific integrated circuit (ASIC) and is utilized to determine when switch 705 is open, and instruct transmitter 701 to transmit the appropriate signal. Transmitter 701 comprises common circuitry known in the art for communication utilizing a well known communication system protocols, such as, but not limited to APCO 25, Bluetooth, IEEE 802.11, or HyperLAN protocols.

Figure 8:
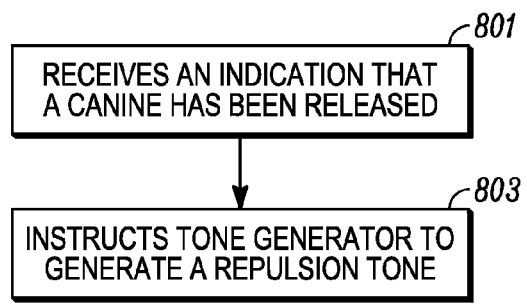
FIG. 8 is a flow chart showing operation of the radio of FIG. 3.

FIG. 8 is a flow chart showing operation of the radio of FIG. 3. In particular, the logic flow in FIG. 8 shows those steps (not all of which are necessary) taken by radio 103 when notified of a canine release. The logic flow begins at step 801 where receiver 302 receives an indication that a canine has been released. As described above, this indication may come from dispatch center 101 (first embodiment) or may come from any device local to the incident scene that is designed to detect the release of a canine. In response, logic circuitry 303 instructs tone generator 305 to generate a repulsion tone (step 803).

It should be noted that upon return of the canine to its handler, a similar instruction may received that causes radio 103 to cease emitting the repulsion tone. This process may take place in a similar manner as described in FIG. 8 with receiver 302 receiving an indication that the canine has been returned to its handler, and instructing tone generator 305 to cease transmitting the repulsion tone.

Figure 9:
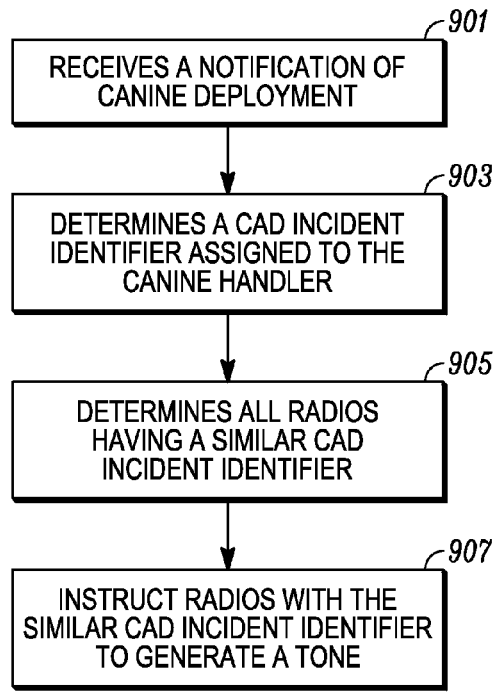
FIG. 9 is a flow chart showing operation of the dispatch center of FIG. 5.

FIG. 9 is a flow chart showing operation of the dispatch center of FIG. 5 in accordance with the first embodiment of the present invention. In particular, the steps shown in FIG. 9, not all of which are necessary, show those steps taken by dispatch center 101 in order to prevent an unwanted canine interaction. The logic flow begins at step 901 where receiver 502 receives a notification of canine deployment at an incident scene. As discussed above, the step of receiving the notification of canine deployment may comprise receiving a radio communication from the canine handler, or receiving a radio communication from a device used to detect canine deployment (e.g., receiving a data communication from a collar or car door).

The logic flow continues to step 903 where logic circuitry 503 determines a computer-aided dispatch (CAD) incident identifier assigned to the canine handler. More particularly, it is assumed that every public-safety officer dispatched to the incident scene was assigned a similar CAD incident identifier; the CAD incident identifier uniquely identifying a particular public-safety incident.

At step 905 logic circuitry 503 determines all radios having a similar CAD incident identifier and uses transmitter 501 to instruct radios with the similar CAD incident identifier to generate a tone (step 907). More particularly, assignment database 505 is accessed to find those radios/responders having a similarly assigned incident identifier, and those radios are instructed to emit a repulsion tone. As discussed above, the step of instructing radios may comprise the step of instructing radios via a data channel communication to the radios.

It should be noted that while it is preferred that there exists a single, unique CAD incident identifier to identify an incident scene, in other embodiments of the present invention there may be more than one incident identifier assigned to a particular incident scene. When this is the case, it is important that all radios assigned to a particular incident scene be identified and instructed to emit the repulsion tone upon release of the canine.

It should also be noted that upon return of the canine to its handler, a similar instruction may be issued by dispatch center 101 that causes radios to cease emitting the repulsion tone. This process may take place in a similar manner as described in FIG. 9 with receiver 502 receiving an indication that the canine has been returned to its handler, detecting those radios with a similar CAD incident ID, and instructing those radios to cease transmission.

Figure 10:
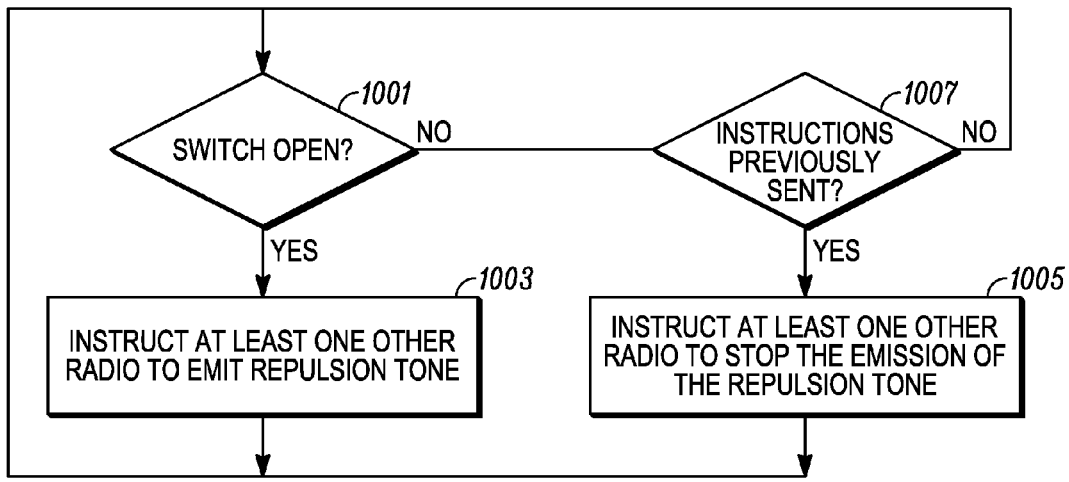
FIG. 10 is a flow chart showing operation of a device designed to aid in preventing unwanted canine interaction.

FIG. 10 is a flow chart showing operation of a device designed to aid in preventing unwanted canine interaction. Such a device may comprise a dog collar or car-door latch that is designed to emit instructions to other radios to emit a repulsion tone. Such a device is shown in FIG. 6 and FIG. 7. The logic flow begins at step 1001 where microprocessor determines if switch 705 has been opened. If so, the logic flow continues to step 1003 where at least one other radio is instructed by transmitter 701 to emit a repulsion tone. The logic flow then returns to step 1001. It should be noted that it may be beneficial for the device shown in FIG. 7 to continuously, or periodically, retransmit the instruction to emit the repulsion tone since other radios may arrive on scene without hearing previous instructions.

If at step 1001 it is determined that the switch is not opened, the logic flow continues to step 1005 where logic circuitry 703 determines if instructions to emit the repulsion tone were previously sent (within a predetermined time period of, say 5 minutes). If not, the logic flow returns to step 1001. If instructions to emit the repulsion tone were previously sent, the logic flow continues to step 1005 where the at least one other radio is instructed by transmitter 701 to cease transmission of the repulsion tone and the logic flow returns to step 1001.

The logic flow in FIG. 10 results in a first radio 700 detecting the release of a canine, and instructing a second radio to emit a repulsion tone. For obvious reasons, first radio may never emit the repulsion tone. The technique in which the first radio detects the release of a canine is preferably via the opening of a switch attached to the latch of a dog collar; however other techniques to detect the release of a canine may be employed. For example, switch 705 may be coupled to a latch of a car door to detect when the canine has been released. Other techniques may employ geo-location or signal attenuation to detect when the canine is departing from its handler. Regardless of the technique used to identify when a canine has been released, the result of FIG. 10 is that a first radio detects the release of the canine, and instructs other radios on scene to emit the repulsion tone.

It should also be noted that instructing radios to emit the repulsion tone may take place by emitting a local peer-to-peer signal that is detected by the other radios, or by reporting the release of the canine to a dispatch center and having the dispatch center report the release to the other radios.

The above logic flow may result in the determination that the canine has been released by determining that a switch has been tripped, or by determining that a distance between a handler and the canine is increasing. The switch may be incorporated into a clasp of a dog collar or into a latch on a car door.

In the foregoing specification, specific embodiments have been described. However, one of ordinary skill in the art appreciates that various modifications and changes can be made without departing from the scope of the invention as set forth in the claims below. For example, any wired or wireless technology that can determine when the canine is in the proximity of the canine's vehicle or canine's handler, and any local or distributed radio network that can convey the release/contained status of the canine to subscriber devices in the incident vicinity. Additionally, other examples for triggering a local alert that a canine has been released include using any short range RF technology to determine proximity of an officer to the canine (such as Bluetooth, Bluetooth LE, or WIFI). When the dog is beyond a predetermined distance from the officer, the alert will be sent.

Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for preventing an unwanted canine interaction, the method comprising the steps of:
   receiving with a receiver, a notification of a canine deployment;
   determining via logic circuitry, an incident identifier assigned to the canine handler;
   determining with the logic circuitry that radios having a similar incident identifier; and
   instructing via a transmitter, radios with the similar incident identifier to generate a tone;
   wherein the incident identifier comprises an identifier uniquely identifying a particular public-safety incident.

2. The method of claim 1 wherein the step of receiving the notification of canine deployment comprises the step of receiving a radio communication from the canine handler.

3. The method of claim 1 wherein the step of receiving the notification of the canine deployment comprises the step of receiving a data communication from a collar or car door.

4. The method of claim 1 wherein the step of instructing radios comprises the step of instructing radios via a data channel communication to the radios.

5. An apparatus comprising:
a receiver receiving a notification of canine deployment at an incident scene;
logic circuitry determining an incident identifier assigned to the canine handler and determining radios having a similar incident identifier; and
a transmitter instructing radios with the similar incident identifier to generate a tone;
wherein the incident identifier comprises an identifier uniquely identifying a particular public-safety incident.

6. The apparatus of claim 5 wherein the notification of canine deployment comprises a radio communication from the canine handler.

7. The apparatus of claim 5 wherein notification of the canine deployment comprises a data communication from a switch.

8. The apparatus of claim 7 wherein the switch is incorporated into a collar or car door.

9. The apparatus of claim 5 wherein the transmitter instructs the radios to generate the tone via sending the instructions via a data channel communication to the radios.

10. The apparatus of claim 5 wherein the transmitter instructs radios with the similar incident identifier to cease generating the tone when it has been determined that the canine has returned to a handler.

* * * * *